US009806980B2

(12) United States Patent
Hutchison et al.

(10) Patent No.: US 9,806,980 B2
(45) Date of Patent: Oct. 31, 2017

(54) METHODS, SYSTEMS, AND COMPUTER READABLE MEDIA FOR PRECISE MEASUREMENT OF SWITCHING LATENCY OF PACKET SWITCHING DEVICES

(71) Applicant: Ixia, Calabasas, CA (US)

(72) Inventors: Michael D. Hutchison, Richmond (CA); Christopher M. Kowalski, Surrey (CA)

(73) Assignee: Ixia, Calabasas, CA (US)

( * ) Notice: Subject to any disclaimer, the term of this patent is extended or adjusted under 35 U.S.C. 154(b) by 409 days.

(21) Appl. No.: 14/228,101

(22) Filed: Mar. 27, 2014

(65) Prior Publication Data

US 2015/0281027 A1 Oct. 1, 2015

(51) Int. Cl.
*H04L 12/26* (2006.01)

(52) U.S. Cl.
CPC .......... *H04L 43/50* (2013.01); *H04L 43/0864* (2013.01)

(58) Field of Classification Search
None
See application file for complete search history.

(56) References Cited

U.S. PATENT DOCUMENTS

| 8,081,650 | B2 | 12/2011 | Dropps et al. | |
| 2002/0141430 | A1* | 10/2002 | Boezen | H04L 12/44 370/425 |
| 2005/0182588 | A1* | 8/2005 | Chenoweth | G01R 31/31907 702/118 |
| 2012/0281979 | A1* | 11/2012 | Xia | H04J 14/0267 398/25 |
| 2014/0023069 | A1* | 1/2014 | Dawson | H04L 43/08 370/389 |

OTHER PUBLICATIONS

Ixia, Higher_Speed_Ethernet Jun. 2011, Ixia, 915-2601-01_revg, 65-70.*
"Understanding Switch Latency," Cisco Nexus 3000 Series Switches, www.cisco.com, pp. 1-6 (Downloaded from the Internet Feb. 5, 2014).

(Continued)

*Primary Examiner* — Noel Beharry
*Assistant Examiner* — Wilfred Thomas
(74) *Attorney, Agent, or Firm* — Jenkins, Wilson, Taylor & Hunt, P.A.

(57) ABSTRACT

Methods, systems, and computer readable media for precise measurement of switching latency of packet switching devices are disclosed. One method includes steps implemented in a network equipment test device including at least one processor. The method includes transmitting frames to a device under test. The method further includes receiving one of the transmitted frames from the device under test. The method further includes determining a measured latency of the device under test based on a difference between a time that the one frame was transmitted to the device under test and a time that the one frame was received from the device under test. The method further includes determining an indication of backlog latency of the device under test caused by the device under test inserting a virtual lane marker in traffic transmitted to the network equipment and reporting the indication of the backlog latency.

20 Claims, 7 Drawing Sheets

(56) References Cited

OTHER PUBLICATIONS

"Enabling 100 Gigabit Ethernet Implementing PCS Lanes," http://www.ixiacom.com/pdfs/library/white_papers/PCS_white_paper.pdf, 915-0909-01, Rev. C, pp. 1-12 (Jan. 2014).

"40 and 100 Gbps Higher Speed Ethernet Reference," Poster Presentation, Ixia, PN 915-0917-01, Rev. A (Sep. 2009).

Trowbridge, "40 GbE and 100 GbE PCS Considerations Key Questions to be Answered concerning OTN mapping for MLD (CTBI) architecture," http://www.ieee802.org/3/ba/public/jan08/trowbridge_01_0108.pdf, Alcatel-Lucent, pp. 1-19 (Jan. 2008).

Sancho et al., "Analyzing the Influence of Virtual Lanes on the Performance of InfiniBand Networks," Proceedings of the International Parallel and Distributed Processing Symposium (IPDPS'02), pp. 1-10 (2002).

"IEEE Standard for a Precision Clock Synchronization Protocol for Networked Measurement and Control Systems," IEEE Std 1588™, pp. 1-289 (2008).

\* cited by examiner

METHODS, SYSTEMS, AND COMPUTER READABLE MEDIA FOR PRECISE MEASUREMENT OF SWITCHING LATENCY OF PACKET SWITCHING DEVICES

TECHNICAL FIELD

The subject matter described herein relates to testing network devices. More particularly, the subject matter described herein relates to methods, systems, and computer readable media for precise measurement of switching latency of packet switching devices.

BACKGROUND

The switching latency of packet switching equipment is a key competitive product feature. For example, Ethernet switch vendors currently advertise latencies on the order of nanoseconds. Because switching latency is an important product feature, switch manufacturers require a mechanism to accurately measure switching latency of their devices.

In general, the switching latency of a switch is a measure of how long it takes the switch to switch a packet from an ingress port of the switch to an egress port of the switch. Thus, a switch manufacturer may test the latency of a device, such as an Ethernet switch, by transmitting packets to the switch, determining when the packets are received from the switch, and calculating the difference between packet transmit and receive times. The average latency value, median latency value, mode latency or other statistical measure of latency derived from the tests may be reported or advertised as a product feature.

In some operational scenarios, the switching latency of a switch may increase beyond the advertised or rated value. Increases in switching latency beyond the advertised or rated latency value may be caused by improper buffering by the switch due to overloading of resources within the switch. However, another cause of switching latency that is not caused by improper buffering is buffering due to transmission of virtual lane markers or identifiers. Virtual lane markers are transmitted by packet switching devices to identify the lane with which the group of packets is associated. In 100 gigabit Ethernet, a compliant device is required to transmit a virtual lane marker or identifier of 160 bits every 207 microseconds. If a test device transmits a packet to a device under test, and the packet is received when the device under test is required to send a virtual lane marker, the measured latency of the device under test will increase even though the increase in latency is not caused by improper buffering by the device under test. It is desirable to account for the effect of virtual lane marker transmission on device latency. Accordingly, there exists a need for improved methods, systems, and computer readable media for precise measurement of switching latency of packet switching devices.

SUMMARY

Methods, systems, and computer readable media for precise measurement of switching latency of packet switching devices are disclosed. One method includes steps implemented in a network equipment test device including at least one processor. The method includes transmitting frames to a device under test. The method further includes receiving one of the transmitted frames from the device under test. The method further includes determining a measured latency of the device under test based on a difference between a time that the one frame was transmitted to the device under test and a time that the one frame was received from the device under test. The method further includes determining an indication of backlog latency of the device under test caused by the device under test inserting a virtual lane marker in traffic transmitted to the network equipment and reporting the indication of the backlog latency.

As used herein, the term "virtual lane marker" refers to a packet that is periodically inserted into a sequence of packets to allow lane identification and de-skewing by a receiver of the packets. The term "virtual lane marker" is intended to include, but not be limited to PCS lane identifiers.

As used herein, the term "processor" includes a device that is implemented at least partially in hardware.

The terms "packet" and "frame" are used interchangeably herein to refer to discrete units of digitized data.

The term "packet switching device" refers to a device, such as an Ethernet switch, that switches packets between ingress and egress ports.

The subject matter described herein may be implemented in hardware alone or in combination with software and/or firmware. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
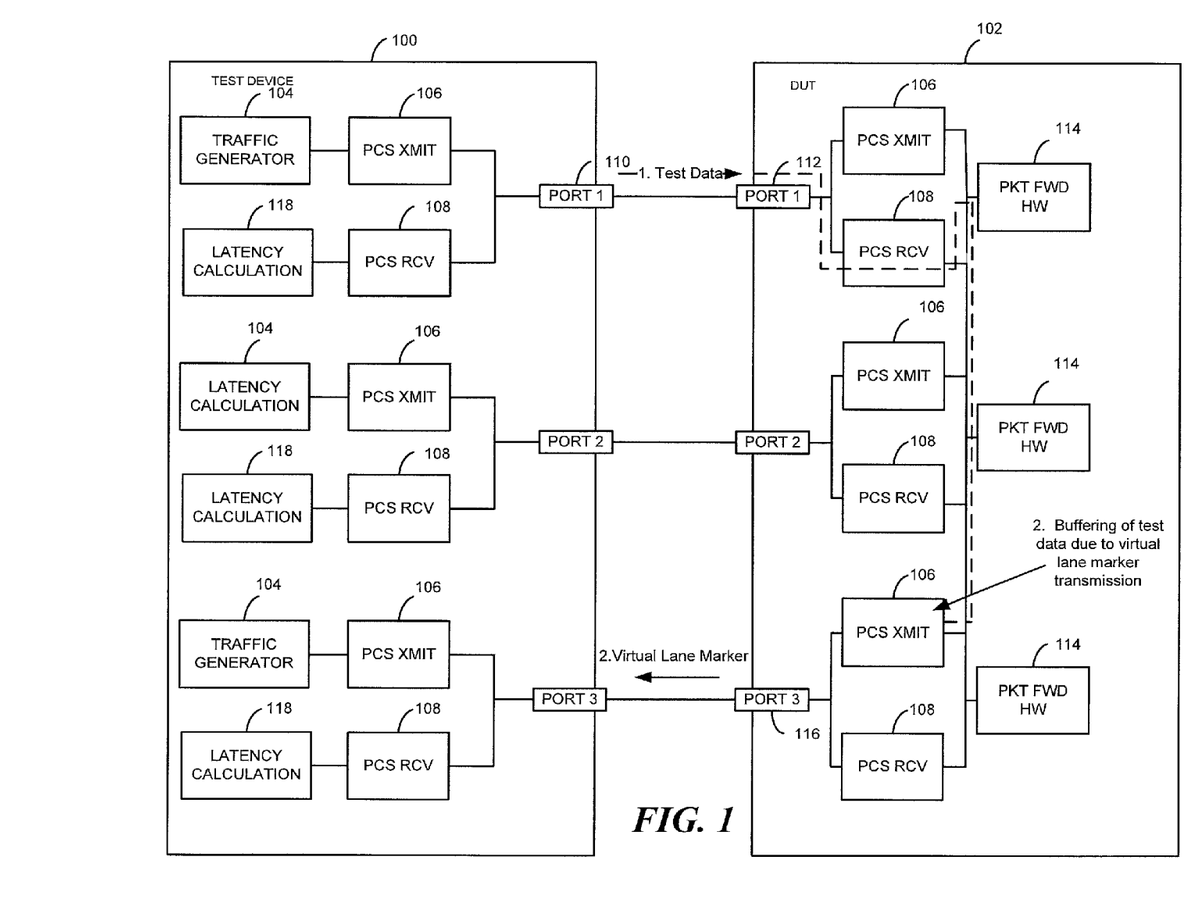
FIG. 1 is a block diagram illustrating an exemplary system for precise measurement of switching latency of a packet switching device according to an embodiment of the subject matter described herein.

The subject matter described herein includes methods, systems, and computer readable media for precise measurement of switching latency of packet switching devices. FIG. 1 is a block diagram illustrating an exemplary system for precise measurement of switching latency of packet switching devices according to an embodiment of the subject matter described herein. Referring to FIG. 1, the system may include a network equipment test device 100 that transmits packets to and receives packets from a device under test 102 (DUT). Network equipment test device 100 includes traffic generators 104 that generate streams of packets or frames to be transmitted to device under test 102. In one example, each traffic generator 104 may generate streams of 40 gigabit traffic, 100 gigabit Ethernet traffic, or any other speed/protocol combination where virtual lane markers may interrupt transmission of packets. The traffic generated by traffic generator 104 includes test packets to be transmitted to device under test 102. Device under test 102 may be a switch, such as a 10G or 40G Ethernet switch.

Both test device 100 and device under test 102 include transmit and receive modules 106 and 108, which in the illustrated example are physical coding sublayer (PCS) transmit and receive modules. Each PCS transmit module 106 is responsible for breaking streams of packets into virtual lanes and inserting virtual lane markers in the virtual lane to allow deskewing by the receiver. Each PCS receive module 108 performs deskewing using the virtual lane markers.

Figure 2:
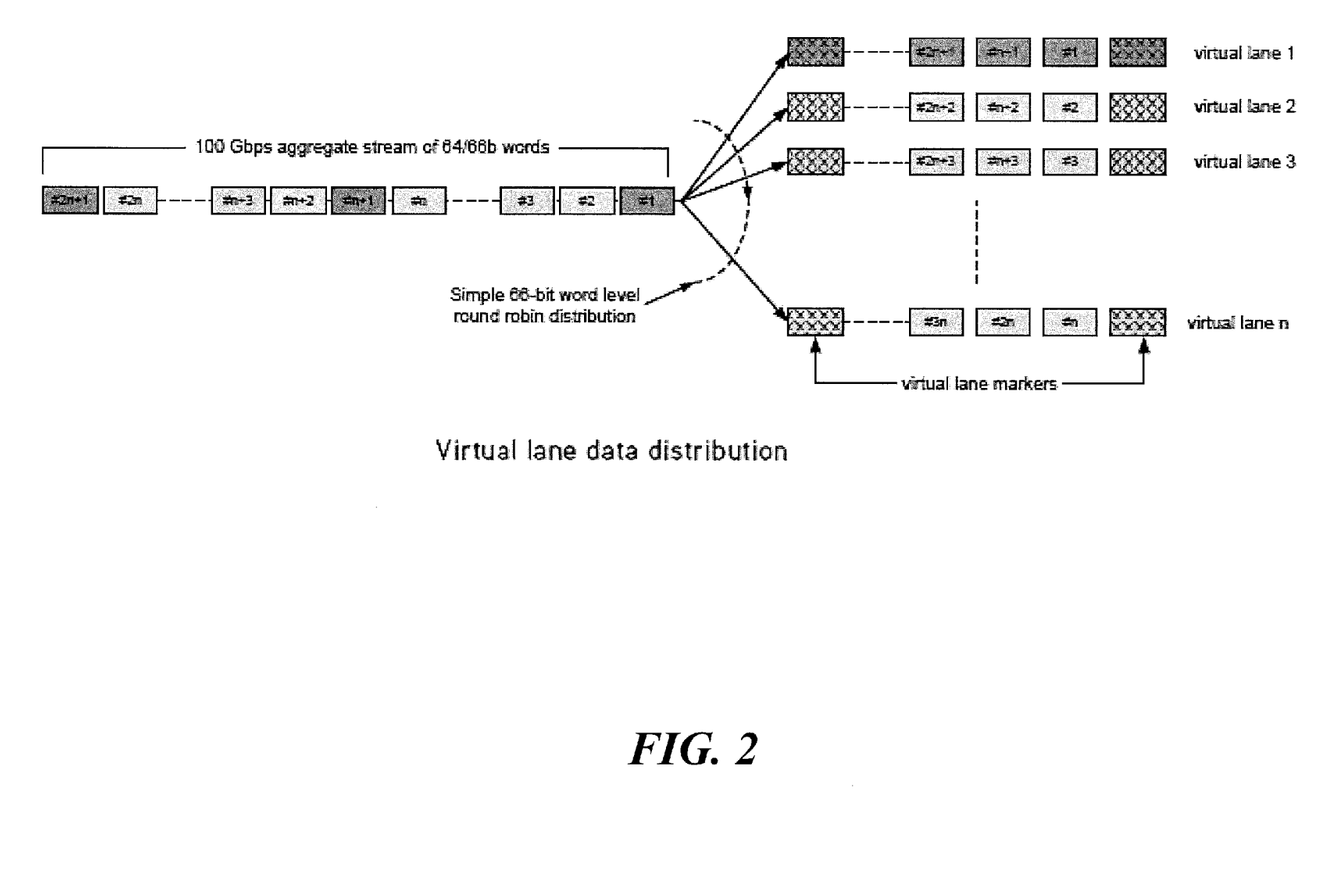
FIG. 2 is a diagram illustrating virtual lane data distribution that may be implemented by a network equipment test device and/or a device under test according to an embodiment of the subject matter described herein.

FIG. 2 is a block diagram illustrating virtual lane data distribution that may be performed by PCS transmit modules 106. Referring to FIG. 2, each PCS transmit module 106 may receive as input an aggregate stream of 64/66 bit words and divide the stream into virtual lanes. Each virtual lane includes a virtual lane marker that is periodically transmitted to allow identification and deskewing of virtual lanes by PCS receive modules 108. Assuming 100 gigabit Ethernet transmission, the virtual lane markers are inserted once every 16,384 clocks. Because the same resources are used for transmission of data and virtual lane markers, the transmission of virtual lane markers will delay transmission of data if there is data to be transmitted at the same time as a virtual lane marker. For 100 gigabit Ethernet, the virtual lane marker is 8 bytes and must be transmitted for each of 20 PCS or virtual lanes, resulting in 160 bytes. The transmission of virtual lane markers consumes (160×8)×1/100 gigabit)=12.8 nanoseconds each 209.7 microseconds.

When a packet is sent through a device under test, the device under test may have to delay transmission of the packet back to the network equipment test device by at worst one virtual lane marker (12.8 nanoseconds) due to the fixed and periodic insertion of the virtual lane marker. Because of this absolute best-case latency measurement, without the subject matter described herein, the best-case latency that can be measured is between 0 and 12.8 nanoseconds. And it is not possible to distinguish incorrectly buffered packets and the fact that the device under test is adhering to virtual lane marker requirements.

The message flow in FIG. 1 illustrates how virtual lane markers can increase latency. In FIG. 1, PCS transmit module 106 associated with port 1 110 of network equipment test device 100 transmits test data to port 1 112 of device under test 102. The test data is received by packet forwarding hardware 114 of device under test 102, which determines that the test data should be forwarded to egress port 3 116 of device under test 102 and forwards the test data to port 3 116. However, at the time that the test data is supposed to transmitted from port 3 116, PCS transmit module 106 associated with port 3 116 transmits a virtual lane marker to network equipment test device 100. As a result, the test data is buffered, and the transmission of the test data from port 3 116 is delayed. Packets that need to be forwarded from port 3 116 will experience increased latency until the buffer is drained. It is desirable that network equipment test device 100 detect and quantify this latency.

Accordingly, network equipment test device 100 includes latency calculation module 118 associated with each port. Latency calculation module 118 calculates latency experienced by Ethernet frames transmitted to and returned from a device under test. First, each latency calculation module 118 may calculate a measured latency based on a difference between a time that a frame is transmitted to device under test 102 and the time that the frame is received from device under test 102. If a virtual lane marker is transmitted by device under test 102 during this interval, the measured latency will include latency caused by the virtual lane marker transmission.

In addition, latency calculation module 118 may determine a backlog latency caused by device under test 102 inserting a virtual lane marker in traffic transmitted to network equipment test device 100. When a virtual lane marker is inserted, it creates a temporary backlog in device under test 102 of 128 bytes of data. This backlog of data is drained by device under test 102 by shrinking the inter-packet gap or inter-frame gap of subsequent packets, for example, from sixteen to eight bytes. Until the 128 bytes of buffered data are drained, packets transitioning the device under test will have increased latency. This creates a backlog latency or latency offset between peaks of 209.7 microseconds, which is the interval between virtual lane marker transmissions.

Although in the embodiment illustrated in FIG. 2, latency calculation modules 118 are associated with each port of network equipment test device 100, the subject matter described herein is not limited to such an embodiment. In an alternate embodiment, a single centralized latency calculation module 118 may calculate switching latencies for packets received on all ports of network equipment test device 100.

Figure 3:
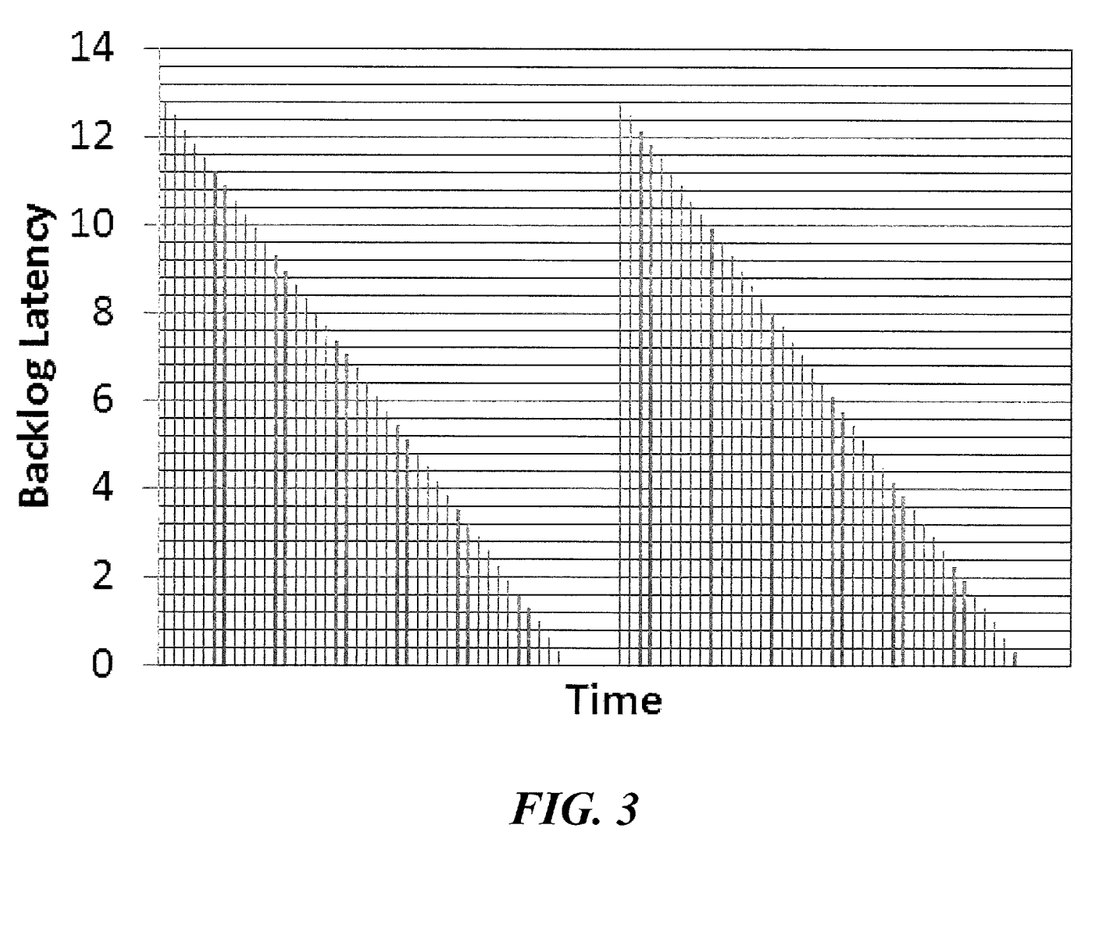
FIG. 3 is a graph illustrating backlog latency resulting from virtual lane marker transmission that may be quantified and reported by a network equipment test device according to an embodiment of the subject matter described herein.

FIG. 3 is a diagram illustrating backlog latency versus time in a device under test. In FIG. 3, each peak in backlog latency is highest immediately after the transmission of a virtual lane marker and decreases as the buffered data is drained. This backlog latency may be calculated by latency calculation modules 118 and reported to the user.

Figure 4:
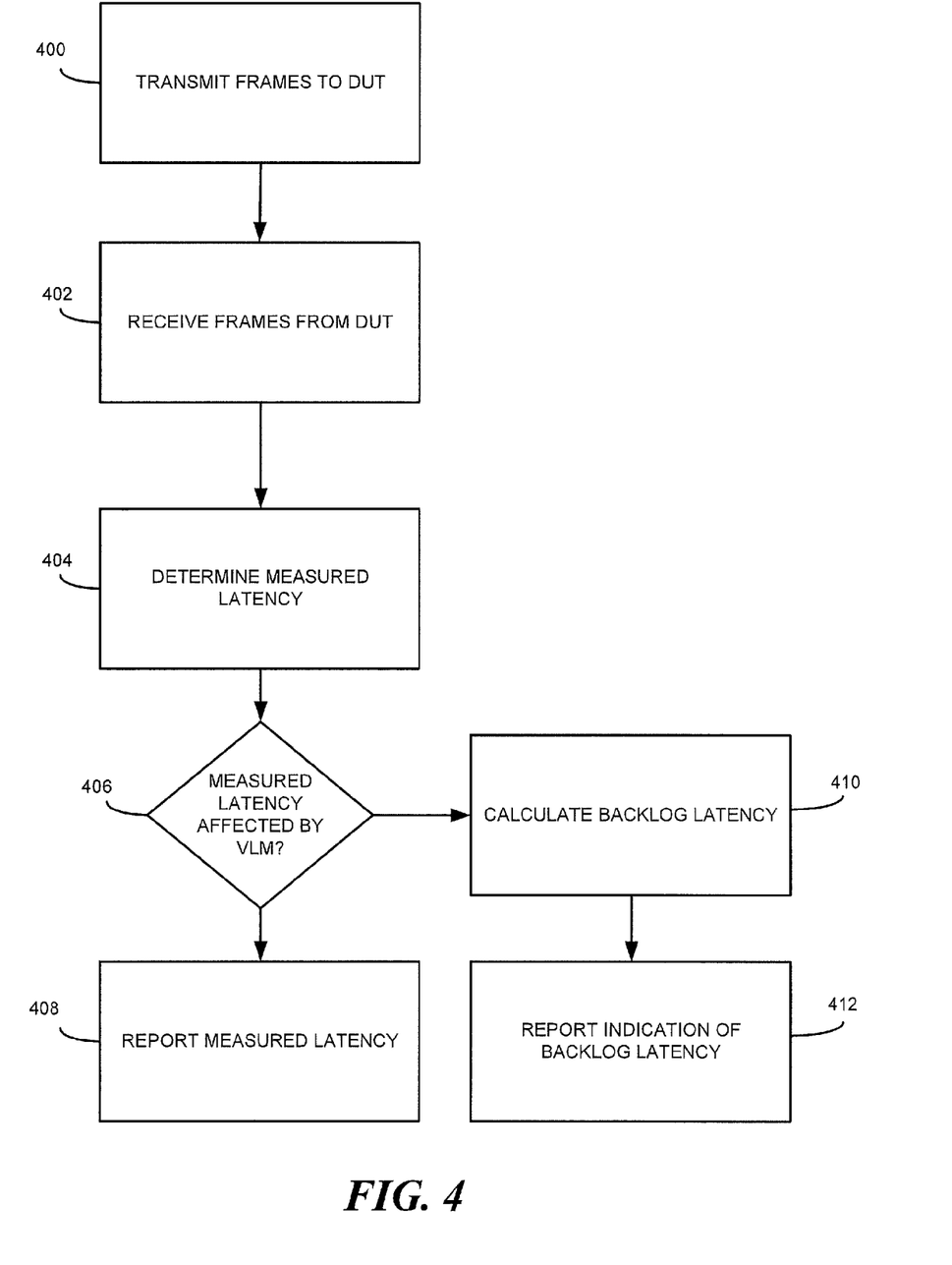
FIG. 4 is a flow chart illustrating an exemplary process for precise measurement of switching latency of a packet switching device according to an embodiment of the subject matter described herein.

FIG. 4 is a flow chart illustrating exemplary steps for precise measurement of switching latency of a packet switching device according to an embodiment of the subject matter described herein. Referring to FIG. 4, in step 400, frames are transmitted to a device under test. For example, a network equipment test device 100 may transmit Ethernet frames to device under test 102. In step 402, one of the transmitted frames may be received from device under test 102. If device under test 102 is a router or a switch, the device under test may be returned to test device 100. In step 404, a measured latency is determined based on a difference between a time that the frame was transmitted to the device under test and the time that the frame is received from the device under test. This step may be performed by a latency calculation module 118 associated with the port on network equipment test device 100 at which the frame is received based on the transmit time stamp and the time of receipt of the packet.

In step 406, it is determined whether the measured latency is affected by virtual lane marker transmission. This step may be performed by latency calculation module 118 by either hardcoding the transmit time of virtual lane markers on a given port or receiving an indication of such transmission from PCS receive module 108. If the latency calculation is not affected by a virtual lane marker transmission, control proceeds to step 408 where the measured latency is reported.

In step 406, if it is determined that the measured latency is affected by virtual lane marker transmission, control proceeds to step 410 where the backlog latency is calculated. The following example illustrates how backlog latency may be calculated.

The inter-arrival time (IAT) of a frame is defined as the time between two frames. In 100 gigabit Ethernet, the inter-arrival time is either 16 byte times or 24 byte times nominally. This is either 8 bytes or 16 bytes of inter frame gap (IFG)+8 bytes of preamble. The inter-arrival time corresponds to 1.28 nanoseconds or 1.92 nanoseconds between frames depending on whether 8 or 16 bytes of IFG are transmitted. To reduce backlog latency, an IFG of 8 bytes will be successively used, rather than alternating the IFG between 8 and 16 bytes. Decreasing the IFG from 16 to 8 bytes allows 8 bytes of buffered data to be drained from the data buffer and transmitted. Thus, if the inter-arrival time is decreased to reduce backlog latency, the amount of decrease per two frames is 1.92 seconds–1.28 nanoseconds or 0.64 nanoseconds.

In one example, network equipment test device 100 may send 64 byte frames to a 100 gigabit Ethernet device under test 102, which is assumed for purposes of this example to have a switching time of exactly 100 nanoseconds. Prior to transmission of a virtual lane marker, network equipment test device 100 will measure a latency of 100 nanoseconds with an inter-arrival time alternating between 1.28 and 1.92 nanoseconds. When device under test 102 needs to transmit a virtual lane marker, the following two events occur:

1) The IAT goes from alternating between 1.28 and 1.92 nanoseconds to 12.8 nanoseconds.
2) The latency increases from 100 nanoseconds to 112.8 nanoseconds.

The latency increases because device under test 102 delays the transmission it wanted to make by 12.8 nanoseconds to accommodate the virtual lane marker. After transmission of the virtual lane marker, the IAT will go back to alternating between 1.28 and 1.92 nanoseconds, but the latency will stay at 112.8 nanoseconds due to buffering in device under test 102. Periodically, device under test 102 will drop some of the inter frame gap to gain back the bandwidth. When this happens, 1.92 nanoseconds IAT will actually be 1.28 nanoseconds and the latency will be reduced from 112.8 nanoseconds to 112.8–0.64 nanoseconds (8 bytes at 100 g)=112.16 nanoseconds. The 112.6 nanoseconds measurement is the backlog latency. The backlog latency will be reduced nineteen more times (20 times total) with the backlog latency decreasing by 0.64 nanoseconds per occurrence until the latency goes back to 100 nanoseconds.

Returning to FIG. 4, after the backlog latency is determined in step 410, control proceeds to step 412 where an indication of the measured and backlog latency is reported to the user. In one example, the actual backlog latency may be reported. In another example, the difference between the measured and backlog latency may be reported as a corrected latency value. In yet another example, the measured latency may be reported and an indication that the latency increased due to transmission of a virtual lane marker may be reported without reporting an actual backlog latency number. Any combination of one or more of these or other backlog latency information elements may be reported to the user. The indication of the backlog latency may be reported to the user visually, for example, on a display device associated with network equipment test device 100.

Clock Synchronization Via Virtual Lane Markers

According to another aspect of the subject matter described herein, the transmit clock of each port of network equipment test device 100 may be synchronized with the transmit clock of test device 102 using virtual lane markers. Ethernet is not a synchronous technology. Many technologies, such as IEEE 1588, attempt to synchronize clocks across Ethernet networks. However, many such methods utilize an external clock source and thus add additional cost network equipment test devices.

In a test environment, if the transmit clock of network equipment test device 100 is not synchronized with the clock of the device under test 102, latency results may be skewed. For example, a test port may send faster or slower than the device under test, which leads to latency problems. If the test port is transmitting faster than the device under test, then the device under test will buffer received frames and latency will increase.

Figure 5:
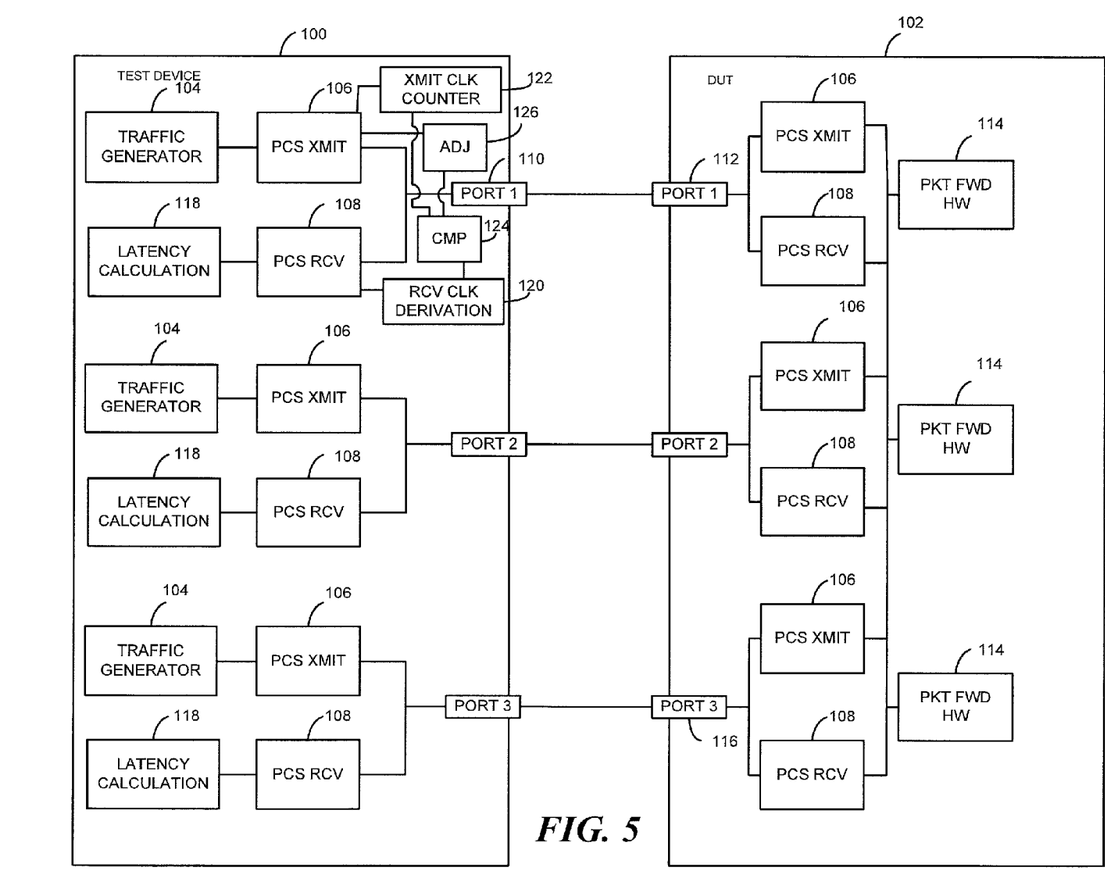
FIG. 5 is a block diagram illustrating receive clock synchronization functionality of a network equipment test device according to an embodiment of the subject matter described herein.

To avoid problems associated with clocks of test device 100 and device under test 102 running at different frequencies, test device 100 may include functionality for adjusting the transmit clock frequency to match the transmit clock of device under test 102. FIG. 5 illustrates such an embodiment. In FIG. 5, port 110 of test device 100 includes a receive clock recovery module 120 that recovers a receive clock based on data received from device under test 102. Port 110 also includes a transmit clock counter 122 that counts the time between transmission of virtual lane markers. The time between transmission of virtual lane markers is one way to measure the transmit clock frequency of test device 100. Port 110 further includes a transmit clock comparison module 124 and an adjustment module 126 that compares the clock frequencies generated by receive clock recovery module 120 and counter 122 and adjusts the frequency of the transmit clock based on the difference between the counts. For example, if the recovered receive clock frequency generated by receive clock recovery module 120 is greater than the frequency measured by transmit clock counter 122, adjustment module 126 may send a signal to PCS transmit module 106 to increase the frequency of the transmit clock. On the other hand, if the clock frequency generated by transmit clock counter 122 is greater than the clock frequency derived by receive clock recovery module 120, adjustment module 126 may send a signal to PCS transmit module 106 to decrease the frequency of the transmit clock.

The remaining ports of network equipment test device 100 may include receive clock recovery module 120, transmit clock counter 122, comparison module 124, and adjustment module 126. However, these modules are only shown for port 110 to simplify the illustration in FIG. 5.

Virtual Lane Marker Synchronization

According to another aspect of the subject matter described herein, network equipment test device 100, for some tests, may synchronize its virtual lane marker transmissions with virtual lane marker transmissions of device under test 102 so that the data transmissions do not occur when test device 100 is required to transmit a virtual lane marker. It may be difficult to synchronize transmission of data to a device under test so that the transmission data does not overlap with the transmission of virtual lane markers in fully meshed transmit scenarios where multiple test ports are sending data to multiple device under test ports. In such a case, virtual lane markers introduce asynchronous disturbance into the system that has no relationship between transmitted and received ports.

However, in simple test cases where the number of transmit and receive ports is small, data transmissions can be timed so that they do not overlap with virtual lane marker transmissions.

Figure 6A:
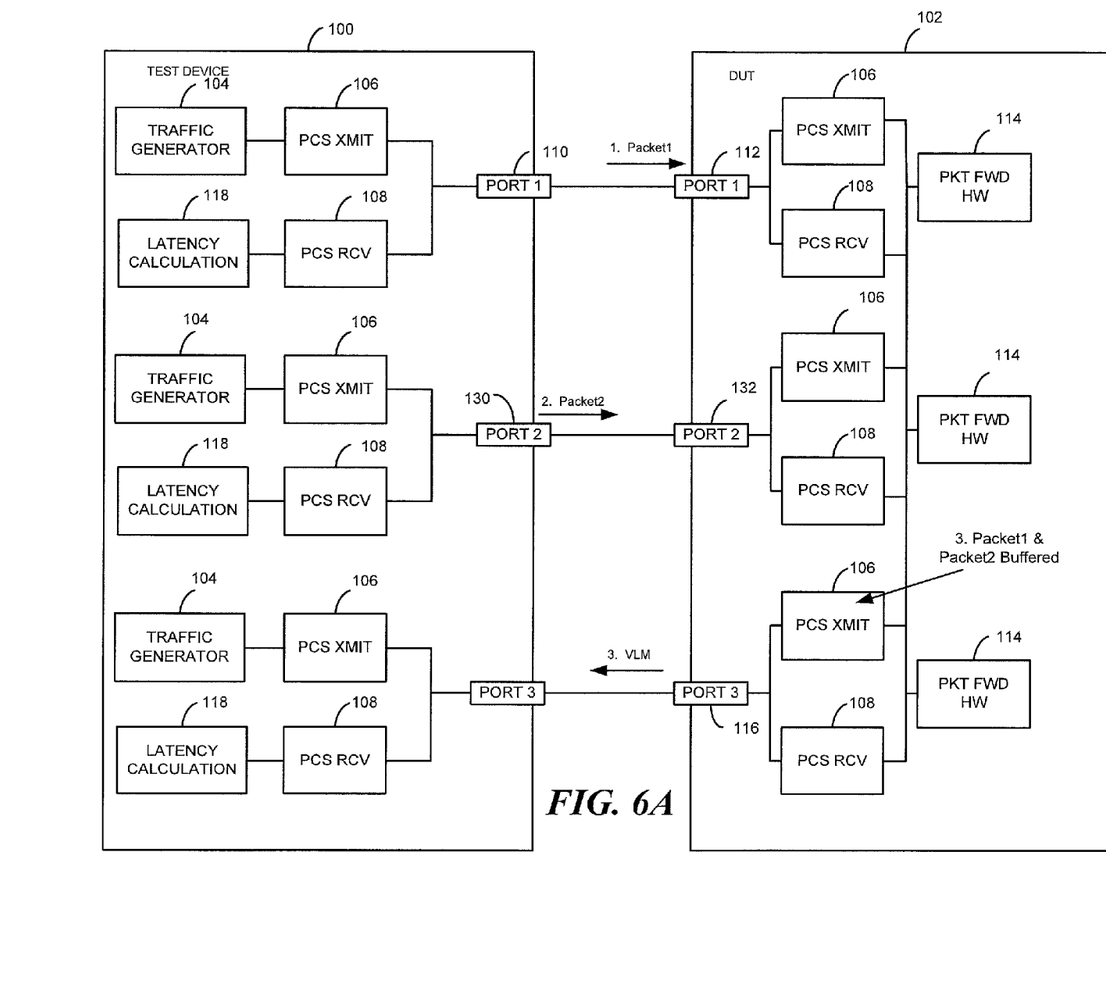
FIGS. 6A and 6B are block diagrams illustrating virtual lane marker synchronization by a network equipment test device according to an embodiment of the subject matter described herein.

FIGS. 6A and 6B illustrate an example of virtual lane marker synchronization that may be performed by network equipment test device 100 according to an embodiment of the subject matter described herein. Referring to FIG. 6A:
- 2 ports 110 and 130 of test device 100 are sending 2 packets, packet1 and packet2, which are perfectly interleaved in time to 2 ingress ports 112 and 132 with a single DUT egress port 116 as the target.
- If we assume that the ports 110 and 130 have implemented logic to ensure that their virtual lane marker mechanisms are perfectly aligned, then the virtual lane markers will not disturb our transmit timing and the frames can be correctly spaced.
- However the DUT egress port 116 may have to insert a virtual lane marker exactly as the packets are meant to leave DUT 102 causing the packets to be buffered; during this virtual lane marker insertion, ports 110 and 130 may continue to send frames that are also buffered in DUT 102.
- The ports 110 and 130 may then pause to insert a virtual lane marker while DUT 102 completes its insertion and drains its buffers.
- This process repeats.

It is possible to align the virtual lane marker insertion throughout the system such that all ports are inserting the markers at the same time. By doing so, buffering due to mis-aligned lane markers would be limited or ideally eliminated in the DUT. The following steps illustrate virtual lane marker synchronization that may be performed by network equipment test device 100 according to an embodiment of the subject matter described herein:
- PCS transmit modules 106 of the ports of test device 100 synchronize their transmit clocks to the DUT transmit clock (using the method described above or using an alternate method, such as synchronizing using an external clock source).
- PCS receive modules 108 of the ports of test device 100 may discover the virtual lane markers from the DUT and inform PCS transmit modules 106. In response to the detection or discovery of a virtual lane marker transmission by the device under test, PCS transmit modules 106 may synchronize their transmission of virtual lane markers with the transmission of virtual lane markers by the device under test.

Figure 6B:
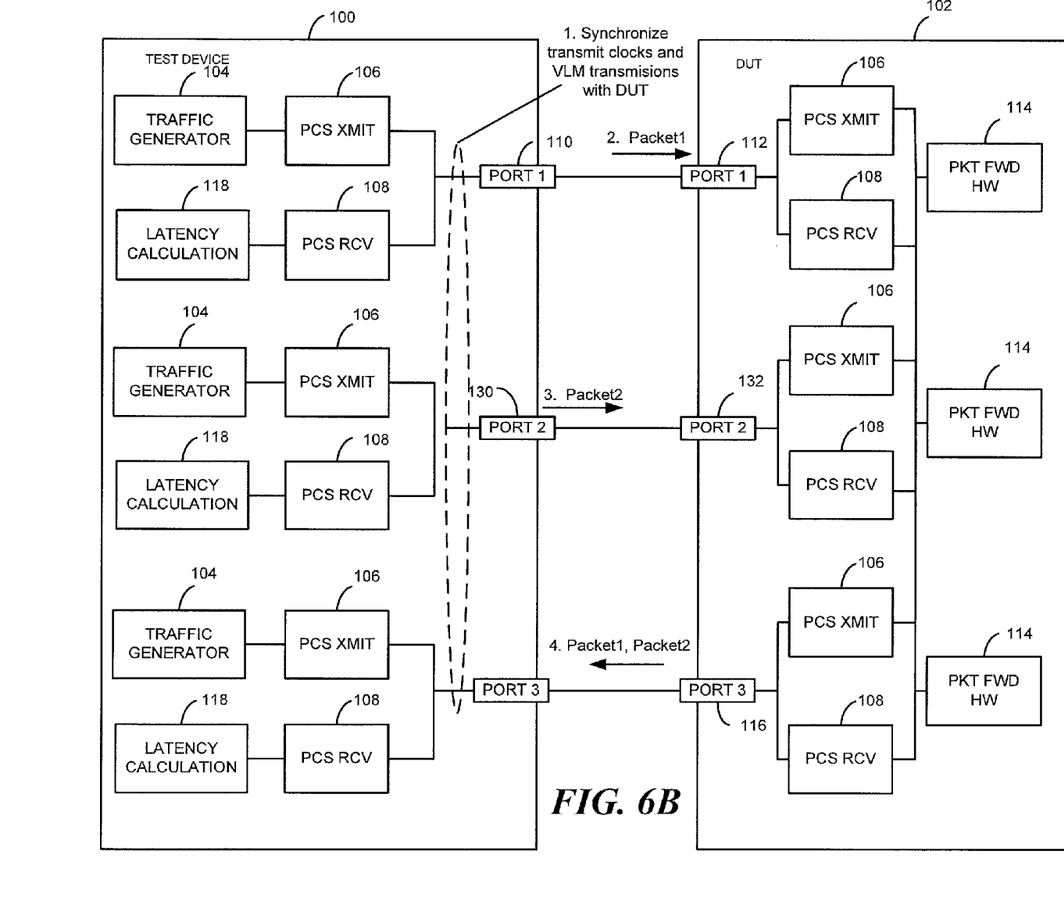

If virtual lane marker transmission is synchronized in this manner, a port of test device 100 would never be sending a data packet while the DUT 102 is inserting its virtual lane marker into the stream of packets to be transmitted to test device 100. As a result, no buffering caused by virtual lane marker transmission should be present, resulting in dramatically reduced latency variation. For example, as illustrated in FIG. 6B, in step 1, the receive clocks of network equipment test device 100 are synchronized with the transmit clocks of DUT 102, and virtual lane marker transmissions to DUT 102 are synchronized with virtual lane marker transmissions from DUT 102. In steps 2 and 3, packets 1 and 2 are respectively transmitted from ports 110 and 130 of test device 100. Packets 1 and 2 are switched by DUT 102 to egress port 116. Because virtual lane marker transmission is synchronized, packets 1 and 2 are switched and transmitted in step 4 from egress port 116 without buffering within DUT 102.

It may be desirable to permit the customer to specify a virtual lane marker skew (i.e. delay between when we receive and transmit a lane marker) in order to account for any internal pipeline delays in the DUT. PCS transmit modules 106 in conjunction with an associated user interface may provide for user specification of virtual lane marker skew by allowing the user to input a pipeline delay that PCS transmit modules 106 use to delay transmission of virtual lane markers after transmission of virtual lane markers by the device under test.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for measurement of switching latency of a packet switching device, the method comprising:
in a network equipment test device including at least one processor:
transmitting frames to a device under test;
receiving one of the transmitted frames from the device under test;
determining a measured latency of the device under test based on a difference between a time that the one frame was transmitted to the device under test and a time that the one frame was received from the device under test;
determining an indication of a backlog latency of the device under test caused by the device under test inserting a virtual lane marker in traffic transmitted to the network equipment test device, wherein determining an indication of the backlog latency includes calculating an amount of latency caused by insertion of the virtual lane marker that remains after the device under test reduces an interframe gap to gain back bandwidth lost from the insertion of the virtual lane marker and quantifying the backlog latency over time from an initial value following transmission of the virtual lane marker and as the backlog latency decreases due to transmissions of buffered data by the device under test during intervals after transmission of the virtual lane marker when the device under test reduces the interframe gap; and
reporting the indication of the backlog latency.

2. The method of claim 1 wherein determining the measured latency includes determining a difference between a transmit time of the one frame to the device under test and a time of receipt of the one frame from the device under test.

3. The method of claim 1 wherein determining an indication of a backlog latency includes calculating the backlog latency based on a time of transmission of the virtual lane marker and a number of interframe gaps that have occurred since transmission of the virtual lane marker.

4. The method of claim 1 comprising synchronizing a transmit clock of the network equipment test device with a clock of the device under test using virtual lane markers received from the device under test.

5. The method of claim 4 wherein synchronizing the transmit clock of the network equipment test device with the clock of the device under test includes:
   deriving a transmit clock frequency of the device under test from a signal received from the device under test;
   deriving a transmit clock frequency of the network equipment test device using virtual lane markers; and
   comparing the transmit clock frequency of the device under test with the transmit clock frequency of the network equipment test device and adjusting the transmit clock frequency of the network equipment test device based on results of the comparison.

6. The method of claim 1 comprising synchronizing transmission of virtual lane markers to the device under test with transmission of virtual lane markers by the device under test.

7. The method of claim 6 comprising providing for user specification of skew between the transmission of virtual lane markers to the device under test with respect to transmission of virtual lane markers by the device under test.

8. The method of claim 1 wherein reporting an indication of the backlog latency of the device under test includes reporting the measured latency and the backlog latency as separate numbers.

9. The method of claim 1 wherein reporting an indication of the backlog latency of the device under test includes reporting a difference between the measured latency and the backlog latency.

10. The method of claim 1 wherein reporting an indication of the backlog latency includes reporting the measured latency and an indication that the measured latency includes latency caused by virtual lane marker transmission by the device under test.

11. A system for measurement of switching latency of a packet switching device, the system comprising:
   a network equipment test device including at least one processor and further comprising:
      a transmit module for transmitting frames to a device under test;
      a receive module receiving one of the transmitted frames from the device under test; and
      a latency calculation module for determining a measured latency of the device under test based on a difference between a time that the one frame was transmitted to the device under test and a time that the one frame was received from the device under test, determining an indication of backlog latency of the device under test caused by the device under test inserting virtual lane markers in traffic transmitted to the network equipment test device, wherein determining an indication of the backlog latency includes calculating an amount of latency caused by insertion of the virtual lane marker that remains after the device under test reduces an interframe gap to gain back bandwidth lost from the insertion of the virtual lane marker and quantifying the backlog latency over time from an initial value following transmission of the virtual lane marker and as the backlog latency decreases due to transmissions of buffered data by the device under test during intervals after transmission of the virtual lane marker when the device under test reduces the interframe gap, and reporting the indication of the backlog latency of the device under test.

12. The system of claim 11 wherein the latency calculation module determines the measured latency by calculating a difference between a transmit time of the one frame to the device under test and a time of receipt of the one frame from the device under test.

13. The system of claim 11 comprising at least one module for synchronizing a transmit clock of the network equipment test device with a clock of the device under test using virtual lane markers received from the device under test.

14. The system of claim 13 wherein the at least module for synchronizing the transmit clock of the network equipment test device with the clock of the device under test includes:
   a transmit clock recovery module for deriving a transmit clock frequency of the device under test from a signal received from the device under test;
   a transmit clock counter for deriving a transmit clock frequency of the network equipment test device using virtual lane markers;
   a comparison module for comparing the transmit clock frequency of the device under test with the transmit clock frequency of the network equipment test device; and
   an adjustment module for adjusting the transmit clock frequency of the network equipment test device based on results of the comparison.

15. The system of claim 11 wherein the transmit module and the receive module synchronize transmission of virtual lane markers to the device under test with transmission of virtual lane markers by the device under the test.

16. The system of claim 15 wherein the transmit module provides for user specification of skew between transmission of virtual lane markers to the device under test with regard to transmission of virtual lane markers from the device under test.

17. The system of claim 11 wherein the latency calculation module reports the measured latency and the backlog latency as separate numbers.

18. The system of claim 11 wherein the latency calculation module reports the indication of the backlog latency as a difference between the measured latency and the backlog latency.

19. The system of claim 11 wherein the latency calculation module reports the measured latency and an indication that the measured latency includes latency caused by virtual lane marker transmission by the device under test.

20. A non-transitory computer readable medium having stored thereon executable instructions that when executed by the processor of a computer control the computer to perform steps comprising:
   in a network equipment test device including at least one processor:
      transmitting frames to a device under test;
      receiving one of the transmitted frames from the device under test;
      determining a measured latency of the device under test based on a difference between a time that the one frame was transmitted to the device under test and a time that the one frame was received from the device under test;
      determining an indication of a backlog latency of the device under test caused by the device under test inserting a virtual lane marker in traffic transmitted to the network equipment test device, wherein determining an indication of the backlog latency includes calculating an amount of latency caused by insertion of the virtual lane marker that remains after the device under test reduces an interframe gap to gain back bandwidth lost from the insertion of the virtual lane marker and quantifying the backlog latency over time from an initial value following transmission of the virtual lane marker and as the backlog latency decreases due to transmissions of buffered data by the device under test during intervals after transmission of the virtual lane marker when the device under test reduces the interframe gap; and reporting the indication of the backlog latency.

* * * * *